Mar. 13, 1923.

H. D. JOHNSON

INSECT CATCHER

Filed July 22, 1922

Inventor
H. D. Johnson

By Jack A. Alley
Attorney

Mar. 13, 1923.

H. D. JOHNSON

INSECT CATCHER

Filed July 22, 1922

Inventor
H. D. Johnson
By Jack A. Ashley
Attorney

Patented Mar. 13, 1923.

1,448,447

UNITED STATES PATENT OFFICE.

HARVEY D. JOHNSON, OF CEDAR HILL, TEXAS.

INSECT CATCHER.

Application filed July 22, 1922. Serial No. 576,731.

*To all whom it may concern:*

Be it known that I, HARVEY D. JOHNSON, a citizen of the United States, residing at Cedar Hill, in the county of Dallas and State of Texas, have invented certain new and useful Improvements in Insect Catchers, of which the following is a specification.

This invention relates to new and useful improvements in insect catchers.

The object of the invention is to provide a device which is adapted to be suspended from a cultivator or other wheel supported frame so as to straddle a row of cotton plants, the said device being provided with means for agitating the plants to dislodge insects and infected bolls therefrom, together with receptacles on each side of the plants for receiving the dislodged matter. The device is composed of two corresponding parts, including side members which form a housing or hood thru which the plants may pass; the said parts being connected so as to permit the same to swing laterally during operation to accommodate plants of various sizes in the row.

Another object is to provide novel and efficient agitating means composed of a plurality of elongated coiled springs bent upon themselves with their ends inserted thru the side members in irregular relation and at various angles to said members to form resilient fingers for contacting with the plants, whereby the latter are thoroughly and violently shaken but without injury thereto. A particular feature resides in the removability of said springs, whereby a greater or less number of fingers may be employed as is desired; together with detachable means for securing said fingers in place.

A special object of the invention is to provide brushes in rear of the resilient fingers, a pair of said brushes being secured to each side member with their adjacent ends disposed at substantially right angles and remote ends directed forwardly, whereby said brushes contact with the underside as well as the top and intermediate portions of the plants and the latter are divested of all such matter as boll weevils, worms and infected bolls.

A construction designed to carry out the invention will be hereinafter described together with other features of the invention.

The invention will be more readily understood from a reading of the following specification and by reference to the accompanying drawings, in which an example of the invention is shown and wherein.

Figure 1:
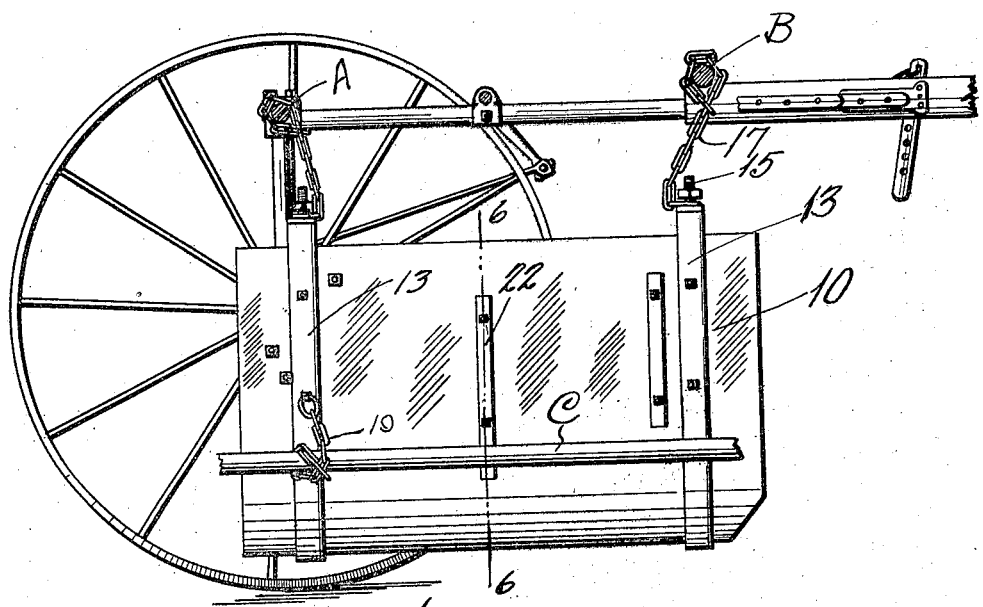
Fig. 1 is a partial view of a cultivator frame carrying an insect catcher embodying my invention, said catcher being shown in side elevation.
Figure 2:
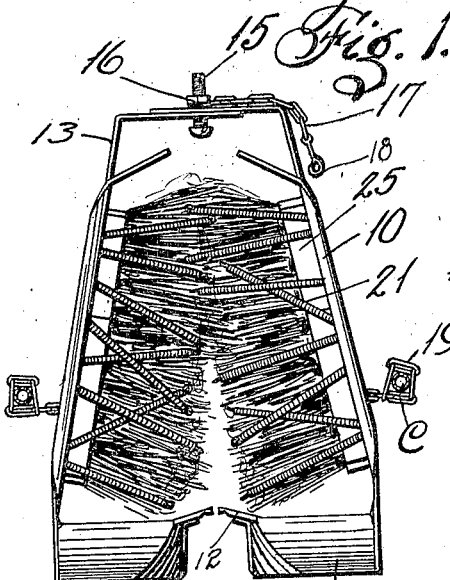
Fig. 2 is a front elevation of the catcher.

In the drawings the numeral 10 designates a pair of corresponding side members which flare outwardly towards the bottom, each having its lower end bent inwardly horizontally and then upwardly to form a trough 11, the upper edge of the latter being inclined outwardly to provide a deflecting lip 12. The tops of the members 10 are inclined inwardly, as is best shown in Fig. 2, whereby the said members constitute a hood or inclosure through which the plants may pass. Each member is braced or carried by a pair of spaced side bars 13 which follow the contour thereof and the trough 11 and terminate under the lip 12. The upper ends of the bars 13 are directed inwardly at substantially right angles to the sides, whereby the ends of the bars of one member overlap those of the other member and are provided with a plurality of adjustment apertures 14 adapted to receive a bolt 15 provided with a nut 16 for connecting the said bars. A chain 17 is connected to each bolt 15 under the nut 16 and the free end thereof has a snap 18. The catcher is adapted to be suspended from a cultivator by looping one of the chains 17 around the arch axle A and fastening said chain by engaging the snap 18 in one of the links thereof, and fastening the other chain in a similar manner to the forward arch B. As is best shown in Fig. 2 the nuts 16 are not screwed down tight against the parts through which the bolts are passed, thereby permitting the side members to swing laterally to such extent as to accommodate the catcher to plants of various sizes in the row. Chains 19 may be secured to the bars 13 of each side member so as to be connected around the cultivator beams C, thereby lending stability to the catcher, if desired.

Figure 3:
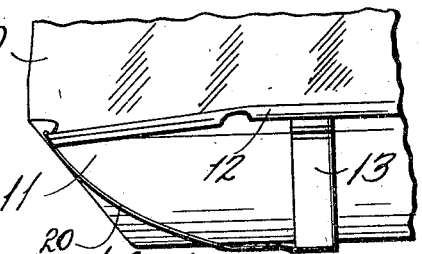
Fig. 3 is an enlarged detail of the forward end of one of the troughs.
Figure 4:
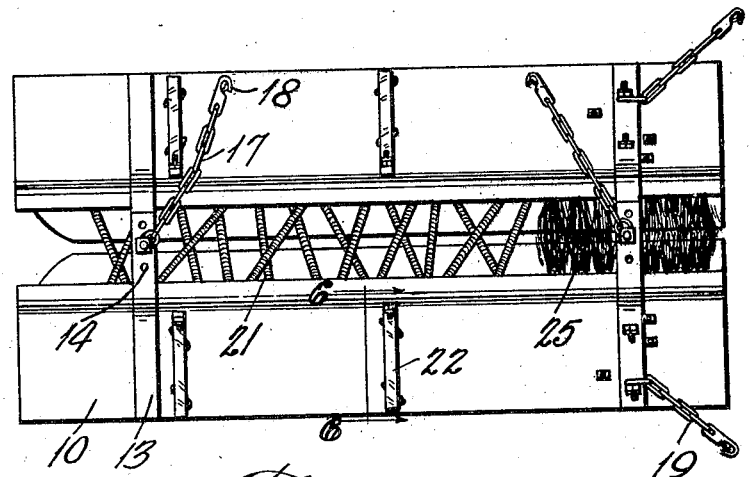
Fig. 4 is a plan view of the catcher.
Figure 5:
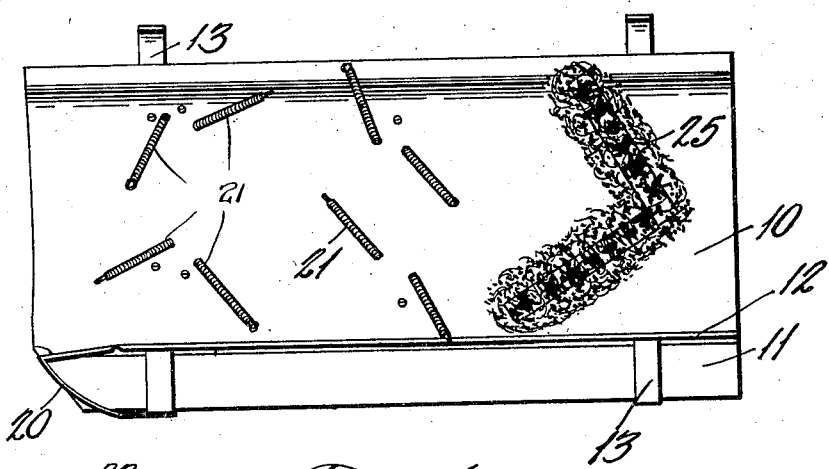
Fig. 5 is an inside elevation of one of the side members.

The front end of each trough 11 is inclined upwardly and is provided with a shoe 20 which is preferably formed of a sheet of metal which is secured to the top edge of the trough and extends under the latter and over the forward side bar 13, the rear edge of said shoe being folded and engaged between said bar and the underside of the trough, as will be seen in Figs. 3 and 5. The inner front corner of each trough is cut away to present a curved surface which will more readily pass over obstacles between the rows.

Figure 6:
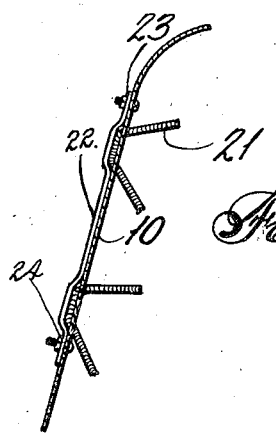
Fig. 6 is a fragmentary sectional view taken on the line 6—6 of Fig. 1.

I provide a plurality of resilient fingers 21 which are formed of elongated coiled springs and which are disposed in staggered relation in the intermediate and forward portions of the catcher. The springs are bent at substantially the middle and have both ends inserted thru apertures provided in the side members, as is best shown in Figs. 5 and 6. The apertures of each row are substantially alined vertically, and the fingers are held in place by means of a clamping strip 22 which engages the outer intermediate portion of the springs in each row, the said strip being removably secured at each end to the side member by means of a bolt 23 and a nut 24, as is best shown in Fig. 6. It is obvious that the number of fingers may be varied and some of the springs may be removed, if it is desired. It will be seen that by the varied arrangement of the said fingers all parts of the plants will be agitated and the latter pass thru the catcher.

In rear of the fingers I mount a plurality of brushes 25 which are arranged in pairs, a pair being secured to each side member 10. The brushes of each pair are disposed at substantially right angles to each other with the remote end of each directed forwardly, as is shown in Fig. 5. The arrangement of the brushes in this manner is very important as it will be seen that as the plants pass thru catcher the same are received in substantially a "pocket" formed by said brushes, and as said plants pass thru the latter they are brushed from their lower portions as well as from their top and intermediate portions. Various devices have been constructed employing brushes for agitating the plants, but the same are objectionable because the brushes tend to bend the plants forwardly so that only the tops are brought into contact with the bristles. It will be seen that in the present invention the plants are received in a cavity or "pocket" between the ends of the brushes and as the plants pass thru the brushes all parts are brought into engagement simultaneously with the bristles.

In operation it is pointed out that the catcher straddles a row so that the plants pass between the side members 10. As the plants are brought into contact with the fingers 21 the branches are shaken in a lively manner thereby dislodging the insects and infected bolls which precipitate into the troughs 11. Said troughs preferably contain a poisonous solution for exterminating the matter falling thereinto. The plants are further agitated by the brushes 25 as they pass rearwardly, the objective matter being received in said troughs, whereby the plants are divested of all pests such as boll weevils and worms, as well as infected bolls which contain the larvæ of said weevils.

It is further pointed out that the side members 10 may be adjusted so as to conform the catcher to larger or smaller plants by means of the apertures 14 in the overlapping ends of the side bars 13. Also, the said ends are connected loosely by the bolts 15, whereby the side members are permitted to swing sufficiently to accommodate irregularities in the sizes of plants in a row.

Various changes in the size and shape, as well as modifications may be made without departing from the spirit of the invention.

What I claim, is:

1. In a catcher of the class described, a pair of side members constituting a substantially inverted U-shaped inclosure adapted to straddle a row of plants so that the latter may pass therethru, elongated troughs carried by said members and disposed within the inclosure, a plurality of elongated coiled springs being bent upon themselves and having their ends inserted thru the said members from the outside thereof to form inwardly directed resilient fingers, the said fingers being disposed in staggered relation and adapted to agitate the plants passing thru the inclosure, whereby the objective matter is dislodged and caused to precipitate into said troughs, and removable clamping strips in engagement with the outer intermediate portions of the said springs to prevent displacement of the latter from the said members.

2. In a catcher of the class described, a pair of side members constituting a substantially inverted U-shaped inclosure adapted to straddle a row of plants so that the latter may pass therethru, elongated troughs carried by said members and disposed within the inclosure, a plurality of elongated coiled springs being bent upon themselves and having their ends inserted thru the said members from the outside thereof to form inwardly directed resilient fingers, the said fingers being disposed in staggered relation and adapted to agitate the plants passing thru the inclosure, whereby the objective matter is dislodged and caused to precipitate into said troughs, and a pair of brushes mounted on the inside of each side member in rear of said fingers, the adjacent ends of the brushes of each pair being disposed at right angles and the remote ends being directed forwardly, whereby the bristles form substantially a "pocket" in which the plants are received and thru which the same pass.

3. In a catcher of the class described, a pair of side members constituting a substantially inverted U-shaped inclosure adapted to straddle a row of plants so that the latter may pass therethru, elongated troughs carried by said members and disposed within the inclosure, a plurality of elongated coiled springs being bent upon themselves and having their ends inserted thru the said members from the outside thereof to form inwardly directed resilient fingers, the said fingers being disposed in staggered relation and adapted to agitate the plants passing thru the inclosure, whereby the objective matter is dislodged and caused to precipitate into said troughs, side bars conforming to the contour of said members and carrying the same, said bars having overlapping ends provided with a plurality of adjustment apertures, means for loosely connecting said ends so as to permit the said members to swing laterally, and flexible means connected with the said overlapping ends and adapted to be wound around the axle and forward arch of a cultivator frame for suspending the catcher therefrom.

In testimony whereof I affix my signature.

HARVEY D. JOHNSON.